United States Patent
Hokanson et al.

(10) Patent No.: US 7,371,328 B1
(45) Date of Patent: May 13, 2008

(54) METHOD FOR TREATING HOG AND ANIMAL WASTE

(75) Inventors: Allan E. Hokanson, Cincinnati, OH (US); Christopher S. Williams, Wilmington, NC (US); Derek Williams, Wilmington, NC (US)

(73) Assignee: Recovery Systems, Inc., Wilmington, NC (US)

( * ) Notice: Subject to any disclaimer, the term of this patent is extended or adjusted under 35 U.S.C. 154(b) by 373 days.

(21) Appl. No.: 10/852,493

(22) Filed: May 24, 2004

Related U.S. Application Data

(63) Continuation-in-part of application No. 09/963,751, filed on Sep. 26, 2001, now abandoned.

(51) Int. Cl.
*C02F 1/52* (2006.01)

(52) U.S. Cl. .............................. 210/710; 71/15; 71/21; 71/61; 210/705; 210/712; 210/718; 210/725; 210/727; 210/764; 210/903; 426/480

(58) Field of Classification Search ................. 71/12, 71/13, 15, 21, 54, 60, 61; 210/609, 631, 210/705, 710, 712, 718, 724, 725, 726, 727, 210/750, 764, 903, 905; 426/478, 480, 657
See application file for complete search history.

(56) References Cited

U.S. PATENT DOCUMENTS

| | | | |
|---|---|---|---|
| 3,875,319 A | 4/1975 | Seckler et al. | 426/431 |
| 4,018,899 A | 4/1977 | Seckler et al. | 426/55 |
| 4,381,996 A | 5/1983 | Kugler et al. | 210/195.1 |
| 4,765,900 A | 8/1988 | Schwoyer et al. | 210/603 |
| 6,083,386 A | 7/2000 | Lloyd | 210/195.1 |
| 6,245,121 B1 | 6/2001 | Lamy et al. | 71/1 |
| 6,409,788 B1 | 6/2002 | Sower | 71/11 |
| 6,464,875 B1 * | 10/2002 | Woodruff | 210/603 |

* cited by examiner

Primary Examiner—Peter A. Hruskoci
(74) Attorney, Agent, or Firm—Coats & Bennett, P.L.L.C.

(57) ABSTRACT

An animal treatment method comprises flushing the animal waste from a barn to a holding tank where the waste is mixed with an alkaline solution to kill pathogens. After neutralization, the solution is separated into solids and liquids. The liquid is treated and recycled as flushing water to clean the barns and/or drinking water for the animals. The solids are separated into digested and undigested feed. The digested feed is further processed for use as a fertilizer and the undigested feed is processed for use as animal feed.

12 Claims, 6 Drawing Sheets

METHOD FOR TREATING HOG AND ANIMAL WASTE

CROSS REFERENCE TO RELATED APPLICATION

This is a continuation-in-part of U.S. patent application Ser. No. 09/963,751, filed on Sep. 26, 2001 and entitled "Method for Treating Hog and Animal Waste", now abandoned.

FIELD OF THE INVENTION

The present invention is related to treating animal waste, especially waste from hog houses.

DESCRIPTION OF THE RELATED ART

A natural byproduct of tending animals is a certain amount of waste, including feces and urine. For factory farms that handle large numbers of animals, the amount of waste produced can be staggering. Hogs in particular are known for their copious waste production.

A typical hog barn or house is about one hundred sixty feet long and forty feet wide, housing about eight hundred hogs. Hog barns come in at least two forms. A first form comprises a sloped floor within the barn that is periodically flushed with water. The water flows around the feet of the hogs and washes waste down the slope within the hog barn into a holding area where it is then pumped or allowed to flow into a lagoon. A second form comprises a slotted floor with a two feet deep cavity thereunder. Approximately eighteen inches of lagoon water fills the cavity to suppress odor. Waste drops through the slots into the standing water. Periodically, the pool is flushed or drained into a lagoon, and the cavity is refilled from the lagoon.

These lagoons are subject to many problems. Fluid from the lagoons is typically sprayed over crops. The solid material may be allowed to decay in the pond or is spread out over a field. Naturally, this creates a rather unpleasant odor for the surrounding area. Further, storms may cause the lagoons to flood, releasing animal waste into the water table. As lagoons age, containing walls may rupture, or the soil forming the lagoon may allow the waste to leach therethrough. In either case, waste and pathogens may find their way into the water table causing problems for municipalities and other people reliant upon that water.

North Carolina is one of the United States' largest pork producers and has been particularly affected by the use of the aforementioned lagoons. Farms may house from six to seven thousand hogs on an average sized farm. A large farm may house up to around 13,000 hogs and produce tons of waste daily. Entire counties are blanketed with a foul smelling miasma of hog waste, stagnant water, and unbathed hogs. Ammonia, hydrogen sulfide, and other noxious compounds contribute to this miasma. The problem has escalated to the point at which the North Carolina state legislature in 1997 announced a moratorium on the construction of new hog farms. This has caused some disturbance amongst the hog farmers who see their livelihood challenged. Thus, there is a need for alternative solutions to the traditional lagoon method of treating and processing hog waste.

SUMMARY OF THE INVENTION

The present invention comprises a method by which water is periodically flushed through an animal confinement area to wash away feces and urine within the animal confinement area. The effluent from the washing is placed in a mixing tank with a lime solution to form a waste mixture. The high alkalinity kills 99.999% of coliforms and 98% to 99.999% of virus pathogens in the effluent as well as breaks down the colloidal bonds of the solids in the waste mixture. Ammonia is removed from the mixing tank and is now reacted with acid to produce fertilizer. The now relative pathogen free waste mixture is concurrently brought down to a more neutral pH. The neutralized waste mixture is placed in a separator with coagulants and flocculants. Dissolved air in liquid is pumped into the waste mixture, pushing the solids to the top of the separator. The separator is decanted to remove the solids, leaving the liquid therein.

The liquid is filtered, treated, and stripped of residual ammonia before return to the animal confinement area. The majority of the fluid is used to flush the animal confinement area, although a portion may also be used to make potable water for the animals.

The solids are washed to separate fecal matter from undigested feed. The undigested feed may be processed for use as feed for animals again while the fecal matter is processed into fertilizer.

DETAILED DESCRIPTION OF THE INVENTION

Figure 1:
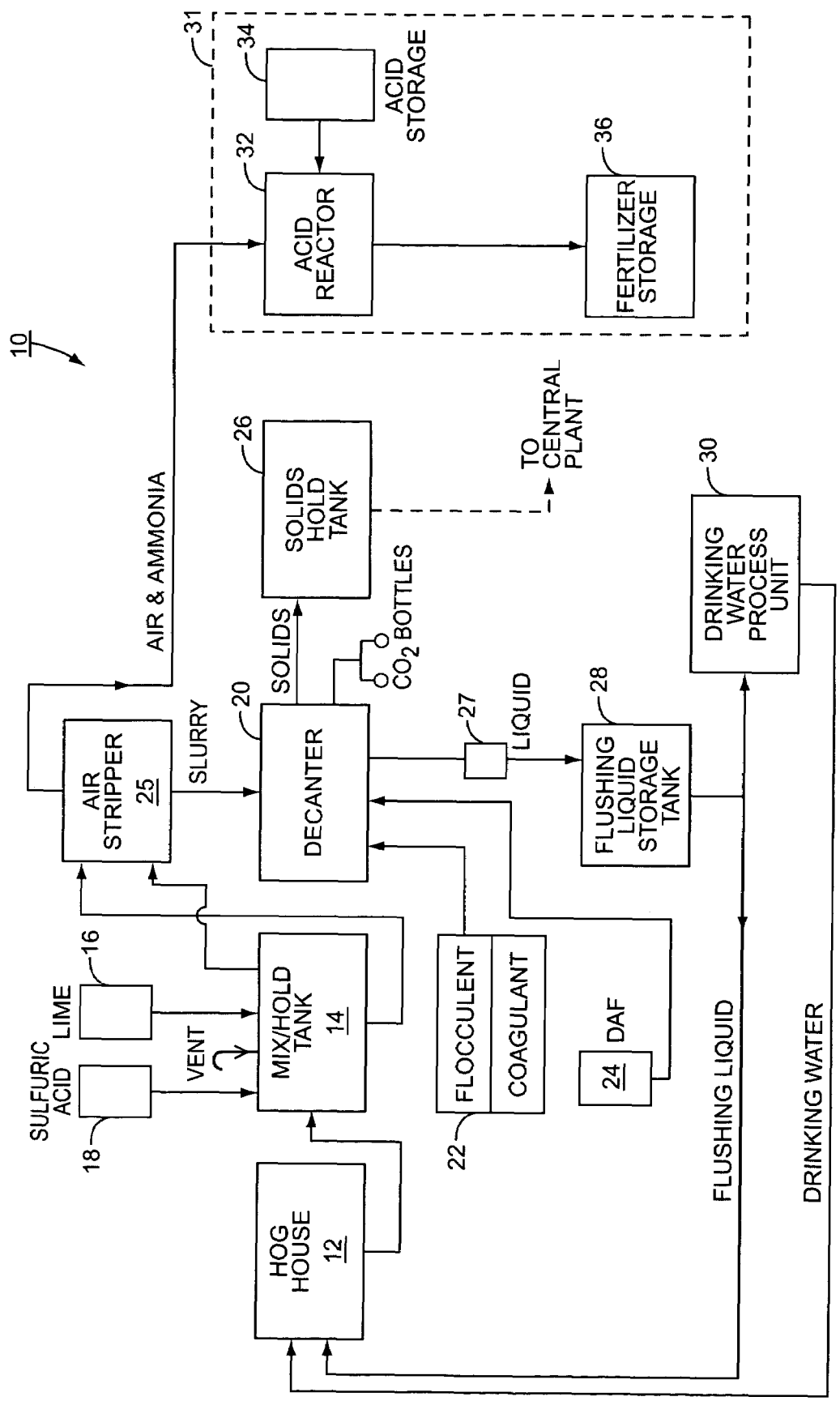
FIG. 1 is a diagrammatic view illustrating the method of the present invention of treating hog and animal waste.

FIG. 1 illustrates a top-level schematic diagram of a system 10 for treating and processing hog waste. System 10 comprises one or more animal confinement areas, such as hog house 12, a mixing and holding tank 14, a decanter 20, a solids holding tank 26, a flushing liquid storage tank 28, a drinking water process unit 30, and an acid reaction process or fertilizer manufacturing unit 31. Water from the flushing liquid storage tank 28 is flushed through the hog house 12 periodically to remove animal waste therefrom. The mixture of water and waste is conveyed to the mixing and holding tank 14 where it is mixed with an alkaline solution from lime storage unit 16. The alkaline solution combines with the water and waste to form a waste mixture, which is mixed and held (still mixing) for approximately one to two hours. The slurry from tank 14 is then pumped through an air stripper 25 where the ammonia is stripped at the same time carbon dioxide neutralizes the liquid. Additionally compressed carbon dioxide tanks are added to feed carbon dioxide into the liquid in the decanter or into the liquid stream prior to entering the decanter. This is completed to insure that the liquid in the decanter is neutral since pH levels above 7 increase the use rate of flocculants and coagulants.

After neutralization, the waste mixture is conveyed to the decanter 20 where flocculants and coagulants are added from flocculent/coagulant storage unit 22. This causes the solids to separate substantially from the liquid of the waste mixture. To further separate the solids from the liquids, dissolved air from DAF unit 24 is bubbled through the decanter 20. At this point, the waste mixture is separated substantially into solids and substantially clear water. Water is added to the decanter 20 to remove the solids therefrom into solids holding tank 26. The remaining liquid within the decanter 20, is filtered in filter 27, and then dumped into the flushing liquid storage tank 28. Some liquid from the flushing liquid storage tank 28 may be treated in the drinking water process unit 30 and used as drinking water for the animals within the hog house 12. The majority of the fluid within the flushing liquid storage tank 28 is used to flush the hog house 12.

Solids within the solids holding tank 26 are conveyed to a central plant. In an exemplary embodiment, a truck or similar vehicle performs said conveying.

When the alkaline solution is added to the mixing and holding tank 14, ammonia is released from the urea and forms ammonium hydroxide and carbon dioxide reacts with lime to form calcium carbonate within the waste mixture. This ammonia is captured and conveyed to an acid reaction process or fertilizer manufacturing unit 31. The ammonia is specifically conveyed to an acid reactor 32 and acid from acid storage unit 34 is mixed therewith. The ammonia reacts with the acid to form a fertilizer that is then conveyed into fertilizer storage unit 36. Any ammonia remaining within the mixing and holding tank 14 is similarly reacted when acid from acid storage unit 18 is mixed with the waste mixture to neutralize the alkalinity thereof.

Figure 2:
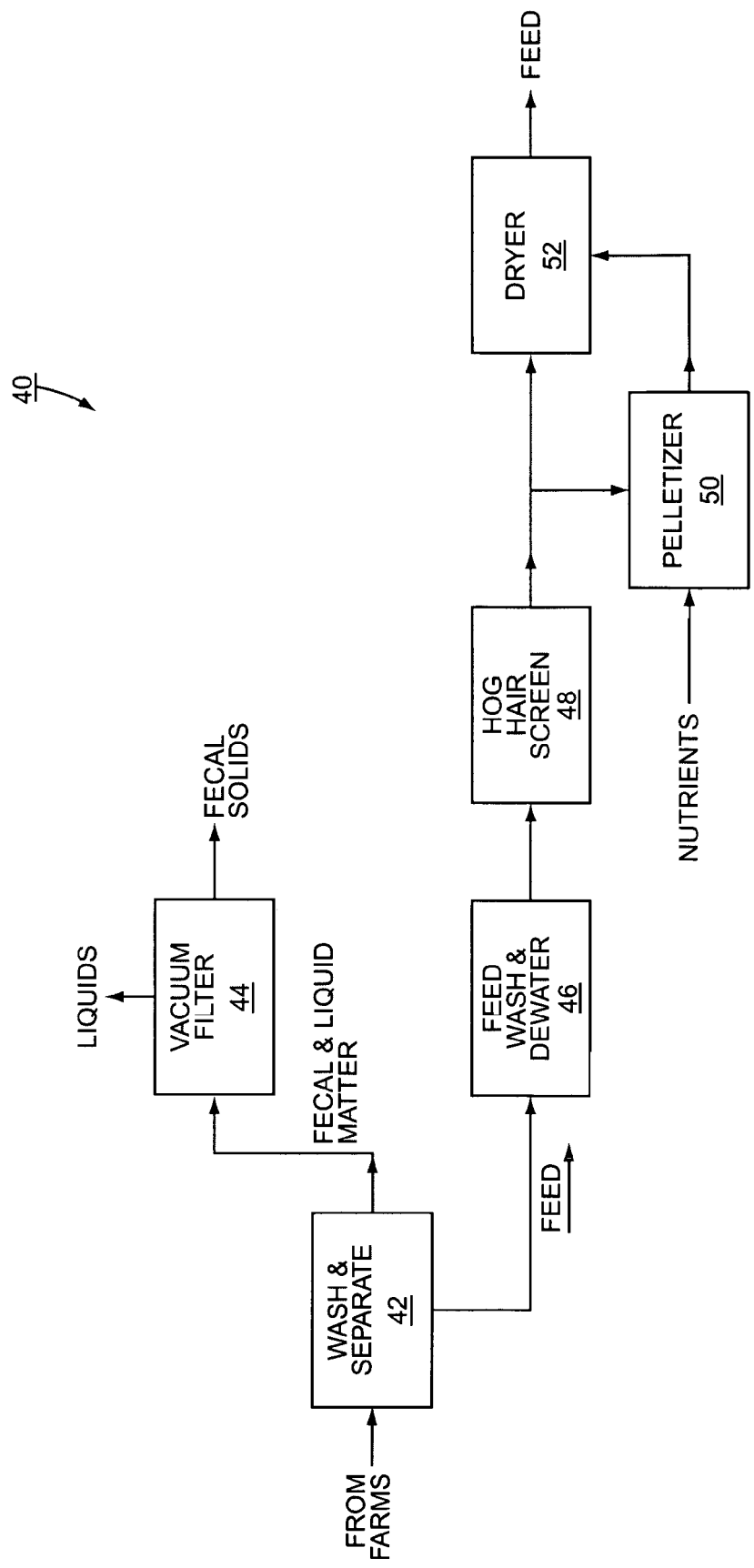
FIG. 2 is a schematic illustration that illustrates a method of treating solids separated from hog waste.

The solids collected from solids holding tank 26 are transferred to a central plant for further treatment and processing. This further treatment and processing is illustrated in FIG. 2. The solids from various farms are collected at the central plant 40 to achieve economies of scale. Note that it is possible that the central plant functions could be performed at an individual farm but may not be economical for smaller farms. The solids are initially washed and separated into 1) fecal matter and liquid which is diverted to a filter 44 and 2) undigested feed which is directed into a feed washing and dewatering stage 46. The fecal matter and liquid are filtered by, for example, a vacuum filter 44 such that the liquid is separated from the fecal solids. The fecal solids may then be used as a fertilizer as needed or desired with or without further processing. The undigested feed is washed again in the feed washing and dewatering stage 46 after which the feed is screened to remove animal hair in screen 48. After removing animal hair, some of the undigested feed may be pelletized with additional nutrients in pelletizer 50. The nutrients are optional and depend on the nutrient content of the undigested feed. In either case, with or without pelletized, the undigested feed is dried in dryer 52 to approximately a 10% water content so as to inhibit fungal growth and is reused as feed for animals.

In an exemplary embodiment wherein the present invention is used to process hog waste, the undigested feed that is recycled is appropriate for feeding to cattle, sows, poultry, and fish farms.

Figure 3:
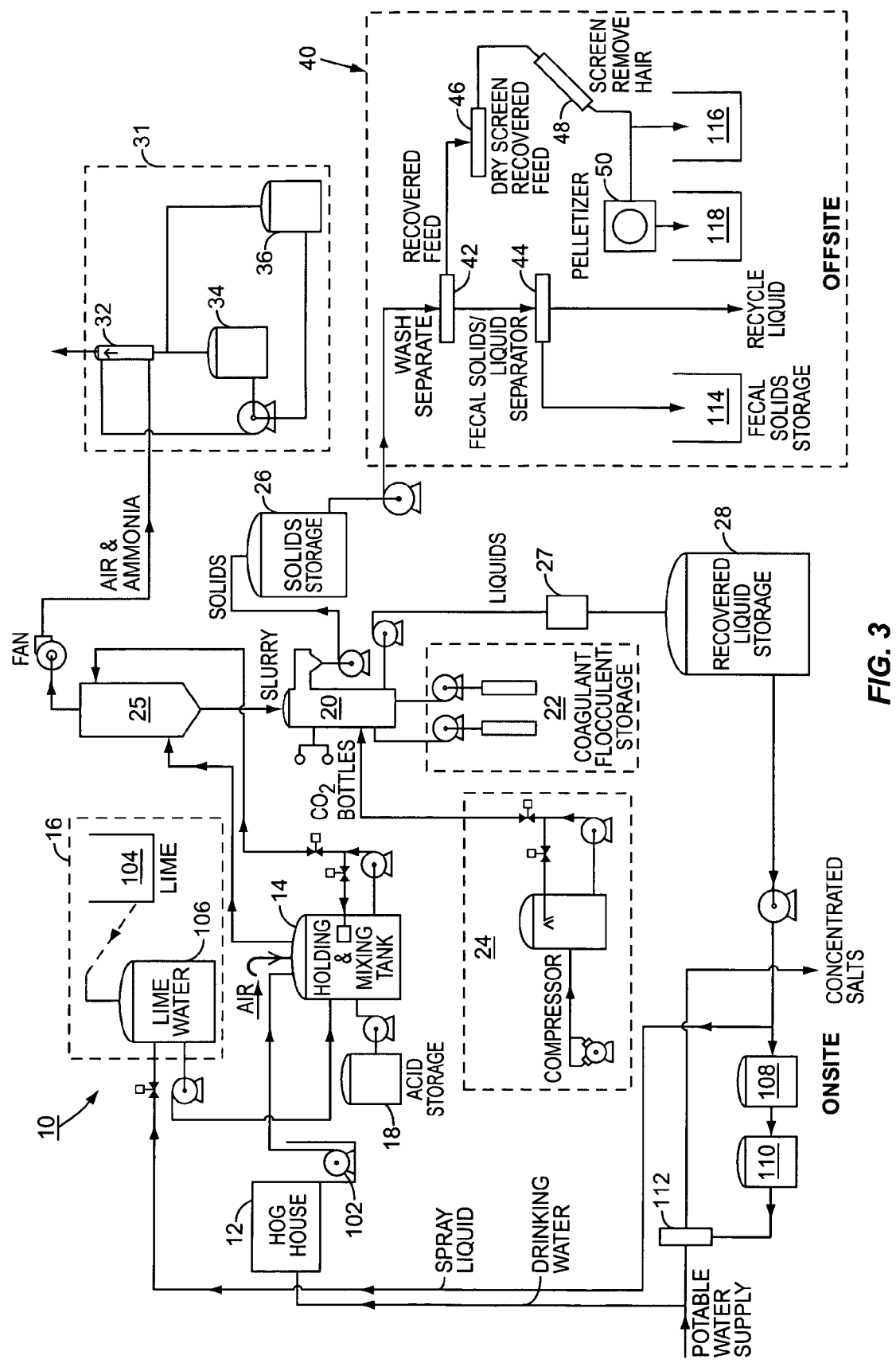
FIG. 3 is a more detailed view of the basic components of a system for treating hog and animal waste according to the present invention.

A more detailed schematic is presented in FIG. 3 with many of the elements illustrated in greater detail. A hog house 12 such as is further illustrated in FIGS. 4 and 5 may contain approximately 800 hogs each producing a number of pounds of waste each day. Water is periodically flushed through the hog house 12 to remove waste from the hog house 12 into a sump area where sump pump 102 pumps the waste to the holding and mixing tank 14. Please note that an emergency line may exist which allows waste to be routed to a conventional animal waste lagoon in certain situations, but this is not an opponent way to treat waste, merely emergency override for the system.

An alkaline solution from the lime storage unit 16 is mixed with the waste to form a waste mixture. In an exemplary embodiment, the pH of the waste mixture is maintained at or above a pH of 11.0. Alternatively, lower pHs may be used, but may not be as efficacious. The alkaline solution in an exemplary embodiment is formed by lime from lime storage unit 104 mixing with water from the flushing liquid storage unit 28 in limewater unit 106. A static mixer (not shown) insures that the alkaline solution and the waste are well mixed to form the waste mixture. The alkaline solution breaks down the colloidal bonds of the solid waste; the urea in the waste reacts with the alkaline solution to release ammonia; and the high alkalinity kills most of the pathogens in the waste. It is postulated that 99.999% of the bacteria are destroyed and 98% to 99.9% Of the viruses are destroyed. Ammonia is drawn off mixing and holding tank 14 by a fan and conveyed to the acid reaction process unit 31.

In an exemplary embodiment, the waste mixture is held in holding and mixing tank 14 for approximately 1 to 2 hours or until substantially all of the urea and solid fecal matter has been broken down. Acid from acid storage unit 18 is then introduced into the waste mixture to neutralize the alkalinity of the waste mixture. In an exemplary embodiment, the pH is reduced to approximately 7-8. In an exemplary embodiment the acid within the acid storage unit 18 is sulfuric acid, which reacts with the remaining ammonia within the mixing and holding tank 14 to form ammonium sulfate, a common fertilizer. Other acids are also contemplated. The neutralization of the waste mixture may be achieved relatively quickly on the order of five minutes. If a highly alkaline solution were pumped through the hog house 12, the alkaline solution would react with the urine in the hog house 12 and release ammonia. This is undesirable. Neutralization of the solution eliminates or at least mitigates this risk.

After neutralization, the waste mixture is directed to the decanter 20 via ammonia stripper 25. In particular, the waste mixture held in mixing and holding tank 14 is directed to the ammonia stripper 25 prior to being directed to the decanter 20. The waste mixture from holding and mixing tank 14 flows through the air stripper 25 and therefrom to the decanter. As the waste mixture passes through the ammonia stripper 25, ammonia is stripped from the waste mixture and the ammonia is directed to the acid reaction unit 31. Decanter 20 is explicated in greater detail with references to FIGS. 6A and 6B. Conventional coagulants and flocculants are added from flocculent/coagulant storage unit 22. These react with the solids of the waste mixture. In an exemplary embodiment, the coagulant is a NALCO 8102 Coagulant and the flocculent is a NALCO 7767 flocculent. Note that if the waste mixture is not neutralized the volume of coagulants and flocculants that must be added to effectuate proper separation is greatly increased. Thus, while it is possible to introduce a highly alkaline waste mixture into the decanter 20, such is not preferred.

After introduction of the coagulants and flocculents, the waste mixture substantially separates into a layer of solids floating on top of slightly murky water. To further clarify the liquid within the decanter 20, a Dissolved Air Floatation (DAF) unit 24 and injects dissolved air into decanter 20. This allows the air to float the solids to the top of decanter 20. Alternatively, induced air may be used to float the solids. The waste mixture may remain in the decanter 20 on the order of twenty minutes or until substantial clarity is achieved in the liquid. Note that the layer of solids floating on top of the relatively clear liquid is comprised of digested and undigested feed. Additional liquid, perhaps from flushing liquid storage unit 28, is added to the decanter 20 to raise the level of water in decanter 20 such that the solids spill through spill way from whence they are pumped, after being stripped of ammonia in ammonia stripper 25, to solid storage unit 26. The liquid within the decanter 20 is then drained or pumped into flushing liquid storage unit 28 for reuse within the system 10. The majority of the flushing liquid within flushing liquid storage unit 28 is used to flush the hog house 12, as well as provide water for the alkaline solution within lime storage unit 16. Some portion of the liquid within the flushing liquid storage unit 28 may be processed into potable water for the animals within the hog house 12 to drink. It should be noted that if potable water is not include in the system 15% to 25% of the returned liquid must be processed through a reverse osmosis unit to prevent the deposition of salts on the pipe walls thus blocking flow. To create this potable water, the water from the flushing liquid storage unit 28 is directed to a sand filter 108 and then through activated carbon filter 110. A reverse osmosis filter 112 removes other impurities and may store salts in a waste storage unit (not shown). Clean water may be stored in a drinking water storage unit (not shown) for later use by the animals.

Ammonia from the mixing and holding tank 14 is, as noted, directed to the acid reaction unit 31, and specifically to the acid reactor 32. The ammonia is mixed with an appropriate acid from acid storage unit 34. In an exemplary embodiment, the acid is nitric acid, phosphoric acid, or sulfuric acid. These three acids are particularly useful, as when they react with ammonia, they create common fertilizers, namely ammonium nitrate, ammonium phosphate, or ammonium sulfate respectively. The resulting fertilizer is, as noted, stored in fertilizer storage 36 for further processing, needed or desired.

As noted, central plant 40 may be co-located with the farm side system 10 if the farm has sufficient output to make it economical. Solids from solid storage unit 26 are transported to washing and separating stage 42 where the fecal matter is washed from the undigested feed. In an exemplary embodiment, the undigested feed remains on top of a screen, while the finer fecal matter is washed therethrough. The fecal matter is conveyed to a filter 44 where the liquid is extracted therefrom. This liquid may be further treated and recycled as needed or desired. The now dry fecal matter may be then conveyed to the fecal solid storage unit 114 for use as a fertilizer or other purposes needed or desired.

The now washed recovered feed is then placed on another screen and washed again to remove the last traces of fecal matter therefrom. The washed feed is then dried to approximately 25% water. Collectively, this washing and dewatering is labeled feed wash and dewater stage 46. The dewatered feed is then conveyed to a screen 48 and screened to remove animal hair. This is important where the undigested feed comes from hogs, as hog hair is particularly undesirable in feed.

Once screened, the undigested feed may be conveyed to a dryer to be dried to approximately 10% water and then conveyed a loose feed storage unit 116. Alternatively, the screened undigested feed may be conveyed to a pelletizer 50 where further nutrients may be optionally combined with the undigested feed and the combination, or the undigested feed alone, may be pelletized as is well understood. After pelletization, the newly made pellets are then dried to approximately 10% water and may be stored in pellet storage unit 118.

Figure 4:
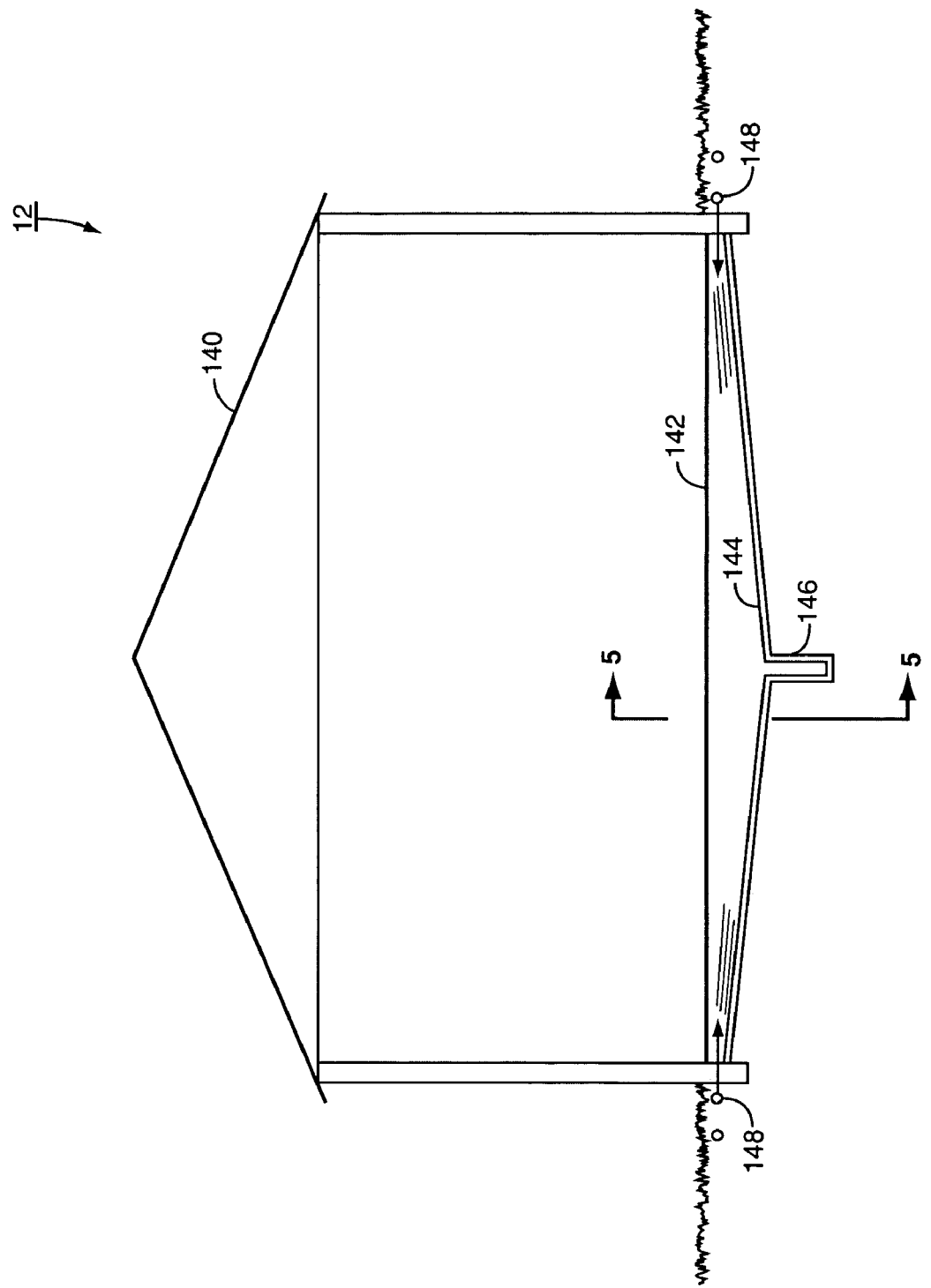
FIGS. 4 and 5 illustrate an animal confinement area adapted for use with the present invention.
Figure 5:
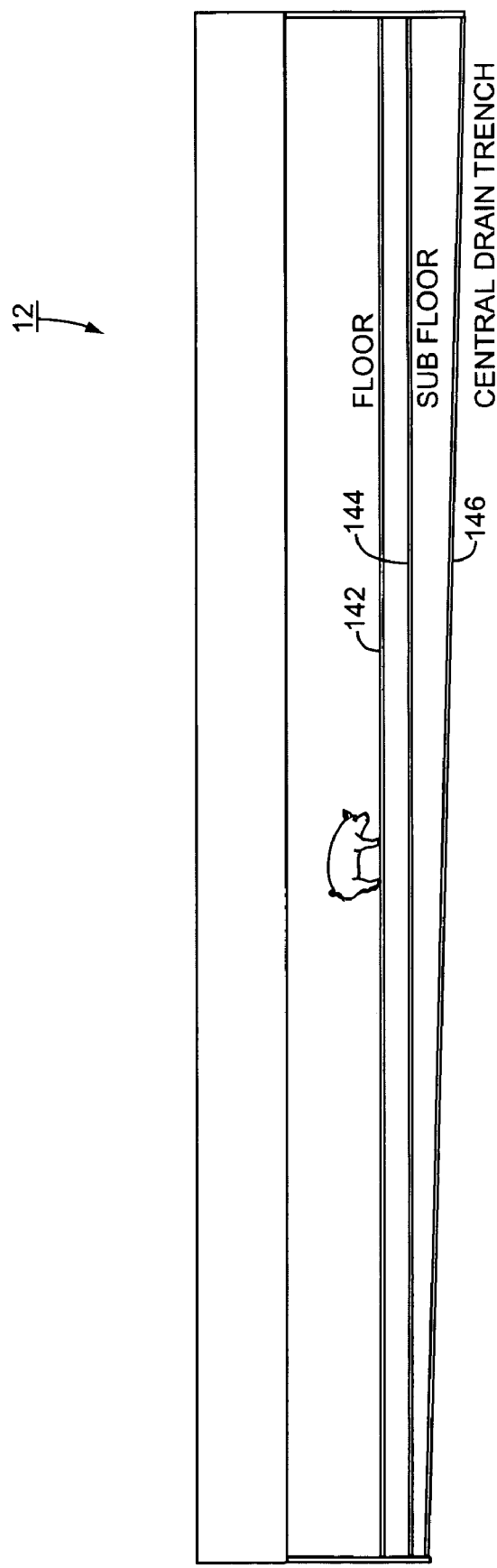

An exemplary hog house 12 is illustrated in FIGS. 4 and 5. Specifically, hog house 12 may comprise a roof 140, a slatted floor 142, a sloped subfloor 144 and a central drain trench 146. Hogs stand on top of floor 142 and defecate as is normal. The waste falls through the slats within a floor 142 onto subfloor surface 144. Periodically liquid flushing storage unit 28 flushes the waste on subfloor 144 down into central trench 146 which is further sloped so as to deposit the waste and liquid at the sump for handling by sump pump 102 as previously explained. In an exemplary embodiment, approximately ⅕ of the jets 148 are actuated at any given time, thus flushing approximately ⅕ of the subfloor 144 at a given time. Alternative arrangements are also possible where in a solid floor is flushed continuously or less frequently as needed or desired. While it is expected that the present system recovers a good portion of the water used, some losses will undoubtedly occur and make up water may be used in this flushing process or elsewhere within the system as needed or desired. It should be appreciated that flushing jets 148 are positioned around the circumference of the hog house 12 such that substantially all of the subfloor 144 may be flushed on a regular base.

As noted above, alternate designs for the hog house 12 may be provided. In one alternate design, the concrete floor of the hog house 12 would include opposed elongated trenches formed therein adjacent opposite sides of the hog house. Hogs will typically utilize these trenches. A flushing system similar to that discussed above can be utilized. In particular, flushing jets would extend downwardly over the trenches and periodically would be activated so as to flush waste down each of the opposed trenches.

Figure 6A:
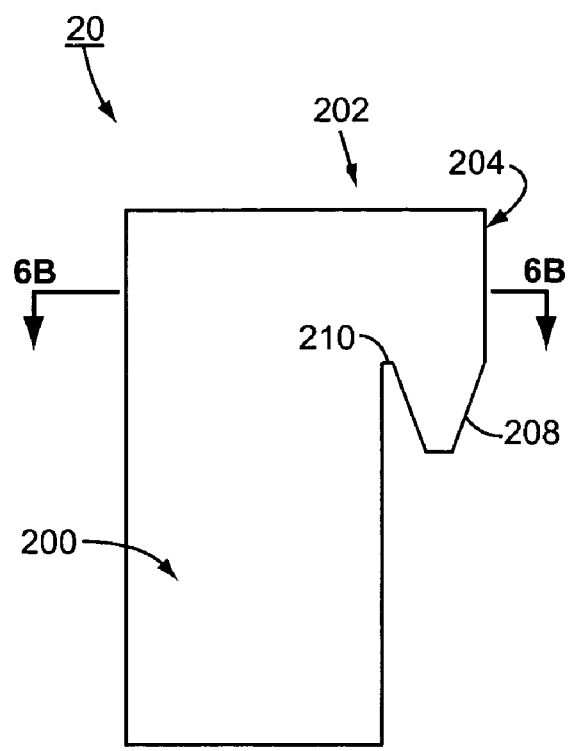
FIGS. 6A & 6B illustrate an exemplary embodiment of the solid separator for use with the present invention.
Figure 6B:
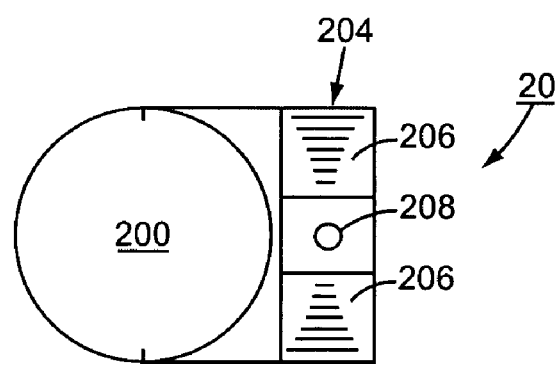

FIGS. 6A and 6B illustrate decanter 20 in a simplified form. Decanter 20 may comprise a primary holding chamber 200 with a top 202. Top 202 is of a diameter greater than the holding chamber 200. Further, top 202 comprises a drain chamber 204. Drain chamber 204 comprises a pair of slanted sidewalls 206 that lead to drain aperture 208. Solids are floated upwardly to a ledge 210 of the top of 202, and then directed through the drain aperture 208.

The method and system for treating hog and animal waste described above has many advantages. First, the system and process eliminates the discharge of animal waste to surface water and ground water through direct discharge, seepage, or runoff. Next, the present system substantially eliminates atmospheric emissions of ammonia. Also, the present system and method substantially eliminates the emissions of odors that are detectable beyond the boundaries of the parcel of land or track of land on which a hog farm is located. The present system also substantially eliminates the release of disease transmitting vectors and airborne pathogens. Finally, the system and process of the present invention substantially eliminates nutrient and heavy metal contamination of soil and ground water.

The present invention may, of course, be carried out in other specific ways than those herein set forth without departing from the scope and characteristics of the present invention. Present embodiments are therefore to be construed in all aspects as illustrative and not restrictive and all changes coming within the meaning and equivalency range of the appended claims are intended to be embraced therein.

The invention claimed is:
1. A method of treating animal waste, comprising:
removing animal waste from an animal confinement area;
passing the animal waste to a holding tank;
mixing a lime solution with the animal waste in the holding tank to create a waste mixture;

maintaining the pH of the waste mixture at 11 or higher within the holding tank for a selected time period;

removing ammonia from the waste mixture, wherein ammonia is removed from the waste mixture by directing the waste mixture through an ammonia stripper and stripping the ammonia therefrom;

transferring the waste mixture to a solids separator;

separating the waste mixture into solids and a liquid;

wherein separating the waste mixture into solids and a liquid comprises transferring the waste mixture from the holding tank to a solids separator and adding a flocculant and a coagulant to the waste mixture and wherein in the solids separator, the solids of the waste mixture move upwardly and overflow the solids separator while the liquid is drained from the solids separator;

after separating the solids, returning the liquid to the animal confinement area for reuse;

continuously flushing the animal confinement area by directing the returned liquid through the animal confinement area; and wherein the animal waste directed to the holding tank includes both solid waste and liquid waste, and wherein as a result of mixing the lime solution with animal waste the method includes breaking down the colloidal bonds of the solid waste in the holding tank, causing the urea of the animal waste in the holding tank to release ammonia, and killing pathogens in the waste mixture in the holding tank.

2. The method of claim 1 further comprising combining the removed ammonia with an acid to form fertilizer.

3. The method of claim 1 further comprising separating undigested feed from said solids for reuse.

4. The method of claim 3 wherein separating undigested feed from said solids includes separating fecal and liquid matter from the solids so as to leave the undigested feed and then treating and processing the undigested feed such that the undigested feed can be fed to animals.

5. The method of claim 1 further comprising filtering the liquid prior to reuse to produce potable water.

6. The method of claim 1 including neutralizing the animal waste after the animal waste has been maintained at a pH of 11 or higher for the selective time period.

7. The method of claim 1 including holding the waste mixture in the holding tank and breaking down the urea and solid fecal matter.

8. The method of claim 1 wherein the separated liquid is directed to a storage tank where the separated liquid is held and ultimately used to flush and clean the animal confinement area.

9. The method of claim 1 including directing the ammonia from the ammonia stripper and mixing the ammonia with an acid to form a fertilizer material.

10. The method of claim 9 wherein the acid mixed with the ammonia is taken from the group including nitric acid, phosphoric acid, and sulphuric acid.

11. The method of claim 1 wherein the holding tank is communicatively connected to the ammonia stripper and wherein the method entails directing air from the holding tank through the ammonia stripper.

12. The method of claim 11 including directing the waste mixture from the holding tank into and through the ammonia stripper and from the ammonia stripper directing the waste mixture to the solids separator, wherein the solids separator is a decanter.

* * * * *